United States Patent [19]

Murase et al.

[11] Patent Number: 4,626,588
[45] Date of Patent: Dec. 2, 1986

[54] CONJUGATED POLYMER FILM AND PYROLYZED PRODUCT THEREOF

[75] Inventors: Ichiki Murase, Ootsu; Toshihiro Ohnishi, Takatsuki; Takanobu Noguchi, Ootsu, all of Japan

[73] Assignee: Director-General of the Agency of Industrial Science and Technology, Tokyo, Japan

[21] Appl. No.: 747,221

[22] Filed: Jun. 21, 1985

[30] Foreign Application Priority Data

Jun. 26, 1984 [JP] Japan .................................. 59-130032
Jan. 9, 1985 [JP] Japan ...................................... 60-869

[51] Int. Cl.$^4$ .............................................. C08F 6/00
[52] U.S. Cl. ................................... 528/481; 528/391; 528/396; 528/502
[58] Field of Search ........................................ 528/481

[56] References Cited

U.S. PATENT DOCUMENTS

| | | | |
|---|---|---|---|
| 3,451,983 | 6/1969 | van Saane et al. | 528/481 |
| 3,532,643 | 10/1970 | Wessling et al. | |
| 3,706,677 | 12/1972 | Wessling et al. | 428/220 |
| 4,046,749 | 9/1977 | Hawkins | 528/481 |
| 4,108,942 | 8/1978 | Chalk et al. | 528/481 |
| 4,207,408 | 6/1980 | Economy et al. | 528/481 |

OTHER PUBLICATIONS

Polymer, 20, 1441 (1979).
J. Polymer Science, A-1, 6, 1058 (1968).
J. Amer. Chem. Soc., 82, 4669 (1960).

*Primary Examiner*—Joseph L. Schofer
*Assistant Examiner*—Bernard Lipman
*Attorney, Agent, or Firm*—Stevens, Davis, Miller & Mosher

[57] ABSTRACT

A high strength and modulus conjugated polymer film which comprises as its principal constitutive unit a conjugated polymer structure represented by the general formula:

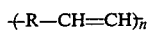

wherein R is an aromatic hydrocarbon group having 6 to 20 carbon atoms which forms a consecutive carbon to carbon conjugated system with vinylene group, and n is an integer of 5 to 50,000, and has a tensile strength of 15 kg/mm$^2$ or more and an elastic modulus of 350 kg/mm$^2$ or more, and a highly electroconductive pyrolyzed product thereof.

9 Claims, No Drawings

CONJUGATED POLYMER FILM AND PYROLYZED PRODUCT THEREOF

BACKGROUND OF THE INVENTION

1. Field of the Invention

This invention relates to a high strength and modulus film of conjugated polymer having excellent mechanical properties, a highly electroconductive carbonaceous material obtained by pyrolyzing a biaxially stretch-oriented film of the conjugated polymer, and a composition thereof.

2. Description of the Prior Art

In recent years, on the basis of the fundamental principle that by introducing a rigid molecular structure into the main chain of a polymer, there is formed a higher order structure which enable the polymer to exhibit its strength and elastic modulus to the maximum, attempts to produce a high strength and modulus film from a synthetic polymer material have increased rapidly.

Polyphenylenevinylene is a straight-chain conjugated polymer in which phenyl groups and vinylene groups are alternately aligned, has a rigid conjugated chain in its main chain, and hence is expected to be excellent in mechanical strength, but it is difficult to form into a film and its mechanical properties have hardly been investigated.

It is already disclosed that a polypehnylenevinylene structure can be formed by a method comprising subjecting a polyelectrolyte of sulfonium salt which is a soluble polymer intermediate to elimination of the sulfonium salt [J. Polym. Sci., A-1, 6, 1058(1968)](hereinafter referred to as "a sulfonium salt decomposition method"). Further, U.S. Pat. Nos. 3,532,643 (1970) and 3,706,677 (1972) disclose that a filmy polyphenylenevinylene molded article can be produced by employing the same reaction as described above, namely, molding a polyelectrolyte of sulfonium salt into a film by casting, followed by subjecting the resulting article to elimination of the sulfonium salt.

As to the mechanical strength of filmy molded article, it is merely described in the above U.S. Pat. No. 3,706,677 (1970) that the filmy polyphenylenevinylene molded article has a tensile strength of 4.9 kg/mm$^2$ and an elongation percentage of 3.5%. These mechanical property values are not sufficient for an excellent film as compared with polyimide films or stretch-oriented polyester films which are known as high strength and modulus films, and mechanical property values sufficient as those aimed at by this invention have not been able to be attained by merely making a simple application of the method disclosed in this patent.

The present inventors noted that a homogeneous polymer film having a phenylenevinylene structure and comprising the conjugated chain thereof as the main constituent could be produced by the sulfonium salt decomposition method, and devoted themselves to research on a method for improving the mechanical properties of said film. As a result, the inventors have found that there can be obtained a high strength and modulus film which have greatly improved performance characteristics and satisfy the condition of mechanical properties above a definite level, whereby the inventors have accomplished this invention.

The present inventors considered that the cause of the low mechanical strength of a polyphenylenevinylene film obtained by the aforesaid well-known sulfonium salt decomposition method is an occurrence of oxidation in the course of the elimination of sulfonium salt, which made improvement of the mechanical properties impossible. Therefore, the inventors have extensively investigated various synthesis conditions for producing a high strength and modulus film, and have consequently found that control of the atmosphere at the time of the elimination of sulfonium salt and stretch-orientation are very important for improving the mechanical properties greatly.

The inventors have also found that a stretch-oriented film having a high strength and modulus can be obtained not only by subjecting a p-phenylenevinylene polymer to stretch-orientation but also by subjecting thereto a conjugated polymer comprising, as recurring unit, vinylene group and aromatic hydrocarbon group conjugated therewith, whereby the inventors have accomplished this invention.

Further, the present inventors noted the molecular structure and higher order structure of the stretched film, especially, biaxially stretch-oriented film of conjugated polymer, and investigated the pyrolysis conditions of the polymer film at a higher temperature in more detail. As a result, the inventors have found that the pyrolyzed product of the biaxially stretch-oriented film becomes a very excellent highly electroconductive carbonaceous material.

The present inventors have already found that a film of p-phenylenevinylene polymer, which is a conjugated polymer, not only can be carbonized while retaining its film form without fusion even when pyrolyzed at a temperature above 400° C., but also undergoes progress of graphitization at high temperatures to become a highly electroconductive carbonaceous material, and that said film is given a higher electroconductivity by doping, and the inventors have proposed it in U.S. patent application Ser. No. 622,582, now U.S. Pat. No. 4,599,193.

The present inventors investigated a method for further improving the electroconductivity, and have consequently found that when a biaxially stretch-oriented film of conjugated polymer, for example, a phenylenevinylene polymer is pyrolyzed in an inert atmosphere at a temperature above 400° C., it not only can be carbonized while retaining its form without fusion but also is readily graphitized by pyrolysis at a high temperature to become a carbonaceous material having a higher electroconductivity than a similarly pyrolyzed unstretched or uniaxially stretch-oriented film, the electroconductivity of which material reaches 10$^4$ S/cm, i.e., a value near that of the electroconductivity of graphite single crystals and becomes as higher as 10$^5$ S/cm by doping.

That is to say, the inventors have found that in pyrolysis of a biaxially stretch-oriented film, the electroconductivity of pyrolyzed film is improved with an increase of the biaxial-stretching ratio before the pyrolysis.

In the case of a uniaxially stretch-oriented film, the electroconductivity after pyrolysis was insufficiently improved with an increase of the stretching ratio, and even excess stretching had a slight improving effect on the electroconductivity.

It was a surprise that thus, biaxially stretch-oriented poly-p-phenylenevinylene could be made into a carbonaceous formed article by pyrolysis without fusion or softening and moreover could be made into a carbonaceous material having a marvolous very high electroconductivity as compared with an unstretched or uniaxially stretch-oriented film. It could not be expected that biaxial stretch-orientation was very effective. It is also very characteristic that a highly electroconductive carbonaceous material can be obtained stably with good reproducibility by using a biaxially stretch-oriented film for pyrolysis.

The fact found here that a highly electroconductive material can be obtained by virtue of biaxial stretch-orientation was found to be the case not only with pyrolysis of poly-p-phenylenevinylene but also with pyrolysis of a conjugated polymer comprising, as recurring unit, vinylene group and aromatic hydrocarbon group conjugated therewith after biaxial stretch-orientation.

SUMMARY OF THE INVENTION

The first object of this invention is to provide a high strength and modulus film of conjugated polymer which comprises as its principal constitutive unit a conjugated polymer structure represented by the general formula:

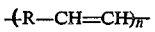

wherein R is an aromatic hydrocarbon group, and having a tensile strength (fracture strength) of 15 kg/mm$^2$ or more and an elastic modulus of 350 kg/mm$^2$ or more.

The second object of this invention is to provide a highly electroconductive carbonaceous material and a method for preparing the same which are characterized in which the biaxially stretch-oriented film of conjugated polymer obtained in the above is pyrolyzed in an inert atmosphere at a temperature above 400° C.

A further object of this invention is to provide a highly electroconductive composition and a method for preparing the same which are characterized in that a carbonaceous material obtained by pyrolyzing a biaxially stretch-oriented formed article of conjugated polymer represented by the general formula in an inert atmosphere at a temperature above 400° C. is treated with a dopant.

DETAILED DESCRIPTION OF THE INVENTION

The conjugated polymer used in this invention is a conjugated polymer obtained by the sulfonium salt decomposition method which comprises synthesizing the conjugated polymer from a polyelectrolyte of sulfonium salt having a recurring unit:

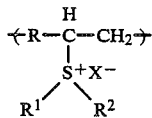

by elimination of the sulfonium salt.

The group R in the conjugated polymer used in this invention is an aromatic hydrocarbon group having a structure which can be conjugated with vinylene group, or a derivative thereof. In particular, aromatic hydrocarbon groups having 6 to 20 carbon atoms or derivatives thereof are preferred.

These groups include p-phenylene group, 4,4'-biphenylene group, 2,5-dimethyl-p-phenylene group, 2,5-dimethoxy-p-phenylene group, etc. Among them, p-phenylene group, 2,5-dimethyl-p-phenylene group and 2,5-dimethoxy-p-phenylene group which are good in symmetry, are preferred. Of these, p-phenylene group and 2,5-dimethoxy-p-phenylene group are particularly preferred.

Each of $R_1$ and $R_2$ is a hydrocarbon group having 1 to 20 carbon atoms, such as methyl, ethyl, propyl, isopropyl, n-butyl, 2-ethylhexyl, dodecyl, octadecyl, phenyl, cyclohexyl, benzyl or the like. Among them, the groups having 1 to 6 carbon atoms, in particular, methyl and ethyl groups are preferred.

As the counter ion, X, of the sulfonium salt, any one may be used by a conventional method, and for the purpose of this invention, there may be used a halogen, carboxylic acid group, hydroxyl group, boron tetrafluoride, perchlorate ion, etc. Among them, halogens such as chlorine, bromine and iodine, and hydroxide ion are preferred. Although the elimination of sulfonium salt from the polyelectrolyte of sulfonium salt can be conducted by applying a condition such as treatment with heat, light or a strong base, the heat treatment is preferred.

The conjugated polymer used in this invention preferably has a sufficiently high molecular weight, and there are effectively used those in which n is 5 to 50,000 and which have such a molecular weight that the polyelectrolyte of sulfonium salt does not pass through a membrane having a molecular cut-off level of 3,500 in dialysis using said membrane.

In view of the purpose of this invention, how to control the elimination reaction of the polyelectrolyte of sulfonium salt greatly influence the mechanical property values of the film of this invention. That is to say, one important point for improving the mechanical properties of the film of this invention is that the elimination of sulfonium salt is conducted in an inert atmosphere in order to prevent oxidation by oxygen or air and deterioration of the performance characteristics by crosslinking.

The term "inert atmosphere" used here means an atmosphere which does not cause deterioration of the polymer film during the elimination of sulfonium salt, and the inert atmosphere is particularly required to prevent oxidation by oxygen or air. Although the elimination is conducted generally in an inert gas such as nitrogen, argon or helium, it may be conducted in an inert medium or under vacuum after flushing the system with an inert gas. The second important point for further improving the mechanical properties is that stretch-orientation treatment is carried out. Although the method for stretching used in this invention is not critical, there are exemplified uniaxial stretching in which stretching is conducted in one direction; biaxial stretching in which stretching in one direction and stretching in another direction non-parallel to said direction are conducted at the same time or successively; and rolling. In the case of a conjugated polymer film obtained by the sulfonium salt decomposition method, said method for stretching includes uniaxial or biaxial stretching by self-shrinkage in the course of decomposition of sulfonium salt. Among these methods, preferable are biaxial stretching in which stretching treatments in non-parallel directions are conducted at the same time, and biaxial stretching by self-shrinkage with fixing the film ends in the course of elimination (decomposition) of sulfonium salt.

In the biaxial stretching methods, the angle between the one direction and the other direction is not critical in the range of above 0° to 90°, though it is preferably in the range of 45° to 90° both inclusive, and more preferably 90°.

These stretching treatments may be given to a conjugated polymer film, but in general, in a process for producing a conjugated polymer from a polymer precursor as in the sulfonium salt decomposition method, it is effective and preferable to carry out the stretching treatments in the course of elimination of sulfonium salt from the polyelectrolyte of sulfonium salt.

The degree of improvement in mechanical properties of the film varies depending on the stretching ratio for a film of polyelectrolyte of sulfonium salt at the time of elimination of the sulfonium salt. In the case of uniaxial stretching, the stretching ratio is usually 1.1 times or more, preferably 3 times or more.

In this case, the film has anisotropy and satisfies the condition of the mechanical properties of this invention in the direction of the stretching. In the case of biaxial stretching, each of the stretching ratios in two non-parallel directions is 1.1 times or more, preferably 1.5 times or more.

The larger the upper limits of these stretching ratios, the better; and the upper limits are not critical. But the usual limits of the stretching ratio is 20 times for uniaxial stretching and 5 times for biaxial stretching. By such a process of this invention, there can be obtained a high strength and modulus film having a tensile strength of 15 kg/mm$^2$ or more and an elastic modulus of 350 kg/mm$^2$ or more. The larger the upper limits of the tensile strength and the elastic modulus, the better; and they are not critical. But the usual limits of the tensile strength and the elastic modulus are 400 kg/mm$^2$ and 20,000 kg/mm$^2$, respectively.

Here, the strength of the uniaxially stretched film means its strength in the direction of the stretching. In the direction perpendicular to the stretching direction, the strength and the elastic modulus are rather lowered. The biaxially stretched film can stably be made into a highly touch and elastic film at a low stretching ratio and hence is particularly preferable for practical purposes. It is observed that these stretching treatments improve the regularity of molecular alignment and the crystallinity. The treatments are considered to be suitable for forming a highly oriented elonged chain which is important for producing a high strength and modulus film. Although the temperature at which the elimination of sulfonium salt is effected in this invention varies depending on the kind of the polyelectrolyte of sulfonium salt, it is generally 30° to 400° C., preferably 100° to 350° C.

Especially, for obtaining the present films of high strength and high elastic modulus, it is preferable to carry out the stretching treatment at a temperature of 30° to 150° C., and then annealing at a temperature of 150° to 400° C.

Further, it has been found that although the conjugated polymer film aimed at by this invention is preferably a completely conjugated system, it need not necesarily consist of only a completely conjugated recurring unit. For example, a polyphenylenevinylene film can be made into a high strength and modulus film even when the sulfonium salt remains in amount of 7% of weight or less, more preferably 5% by weight or less in terms of the sulfur content which is an analytical value of sulfur obtained by elementary analysis after heat treatment for elimination of the sulfonium salt and annealing.

In using the conjugated polymer film of this invention, it can be either used alone or made into a composite by addition of glass fiber, carbon fiber or the like to improve its properties.

Further, in order to improve the heat resistant, weather resistance and oxidation resistance of the film of this invention, thermal stabilizers, ultraviolet ray absorbing agents and/or antioxidants may be incorporated into said film. In addition to them, plasticizers, pigments, lubricants and the like may be used in combination with said film. The film produced by this invention is characterized by having a high strength and a high modulus of elasticity, particularly by having a high modulus of elasticity, and can be used for various purposes as an engineering plastic film in which the heat resistance is utilized.

Next, an electroconductive carbonaceous material and a composition thereof both obtained from the biaxially stretch-oriented film prepared by the above-mentioned method are described below in detail.

In this invention, the pyrolysis temperature of the biaxially stretch-oriented film is preferably above 400° C., and the upper limit of the temperature is determined by the vaporization temperature of carbon. The pyrolysis temperature can be further raised by conducting the pyrolysis in a pressurized system, but this is not economical. For making the film into a highly electroconductive material, the higher the pyrolysis temperature, the better. In practice, the pyrolysis temperature is preferably above 400° C. to 3,500° C., more preferably 800° C. to 3500° C. both inclusive.

When the pyrolysis is conducted at a high temperature of 1,000° C. or higher, it is possible to conduct preliminary pyrolysis at 1,000° C. or lower and then conduct pyrolysis at 1,000° C. or higher.

In this invention, as the atmosphere for the pyrolysis, inert gas atmospheres such as nitrogen gas atmosphere, argon gas atmosphere and vacuum are effective, and at 2,000° C. or higher, argon gas is more preferable.

Although the method of heating for the pyrolysis is not critical, the heat-producing method varies depending on the pyrolysis temperature. That is to say, there are effectively used, at 1,500° C. or lower, a resistance wire heating furnace, a SILICONIT furnace, etc., and at more than 1,500° C. a TAMMANN electric furnace, a high frequency induction furnace, etc.

The thus obtained pyrolyzed product of the conjugated polymer film often has an electroconductivity of $1 \times 10^2$ to $2 \times 10^4$ S/cm.

What is more important is that the electroconductivity is further improved to $10^3$ to $10^5$ S/cm or higher by doping treatment of the pyrolyzed product with an electron aceptor or an electron donor as a dopant. Although the dopant is not critical, there can be effectively used, as the dopant, compounds which have been found to impart a high electroconductivity to graphite or a conjugated polymer such as polyacetylene.

As to a method for the doping, the doping can be conducted by a well-known method, namely, a method comprising bringing the pyrolyzed product into direct contact with the dopant in a vapor or liquid phase, an electrochemical method, ion implantation or the like.

Concrete examples of the electron acceptor include halogen compounds such as bromine, fluorine and the like; Lewis acids such as iron trichloride, arsenic pentafluoride, antimony pentafluoride, boron trifluoride, sulfur trioxide, aluminum trichloride, antimony pentachloride and the like; and protonic acids such as nitric acid, sulfuric acid, chlorosulfonic acid and the like. Concrete examples of the electron donor include alkali metals such as lithium, potassium, rubidium, cesium and the like; alkaline earth metals such as calcium, strontium, barium and the like; rare earth metals such as samarium, europium and ytterbium; and metal amides such as potassium amide, calcium amide and the like. Although the doping amount is not critical, a preferable dopant content is 0.1 to 150%, particularly 10 to 100% based on the weight of the pyrolyzed product.

This invention is characterized in that the pyrolyzed product of the biaxially stretch-oriented film of conjugated polymer undergoes carbonization and graphitization more sufficiently than a pyrolyzed product of a unstretched or uniaxially stretch-oriented film of conjugated polymer, so that a more highly electroconductive carbonaceous material can be provided.

Further, it is also industrially very advantageous that the pyrolysis temperature necessary for graphitizing the biaxially stretch-oriented film is lower than that necessary for graphatizing an unstretched film.

Although the reason for this is not clear, it seems as follows. Since by virtue of the stretching in two directions, the film tends to have a structure in which the aromatic ring face in the molecule is oriented parallel to the film surface, condensation of the molecules with one another at the time of pyrolysis is facilitated, so that the graphite structure becomes easy to form.

This invention is further explained below in more detail referring to Examples, which are not by way of limitation but by way of illustration.

EXAMPLE 1

(1) Preparation of a cast film of polyelectrolyte of sulfonium salt

In 250 ml of distilled water was dissolved 22 g of p-xylylenebis(diethylsulfonium bromide), after which the resulting solution was subjected to condensation polymerization at 0° to 5° C. in a nitrogen gas atmosphere by use of an aqueous solution prepared by dissolving 4 g of sodium hydroxide in 250 ml of distilled water, to obtain an aqueous solution of a polyelectrolyte of sulfonium salt having bromide of diethylsulfonium in its side chains, a precursor polymer. After the polymerization, this aqueous solution was dialyzed against a cellulose membrane having a molecular weight cut-off level of 8,000 while bubbling nitrogen gas through the solution. The polymerization solution was filtered through a microfilter having a pore diameter of 10 μm, and the filtrate was concentrated to a concentration of 3% by weight by means of a rotary evaporator, thereafter cast, and then dried in a stream of nitrogen to produce a cast film of the polyelectrolyte of sulfonium salt having a thickness of 10 to 50 μm.

(2) Preparation of a polyphenylenevinylene film

An unstretched film was produced by subjecting the cast film of polyelectrolyte of sulfonium salt to elimination of the sulfonium salt by stationary heating at a predetermined temperature for 30 minutes in a nitrogen gas atmosphere using a horizontal type tubular electric furnace. A uniaxially stretch-oriented film was produced in the following manner. The cast film was fixed on a stretching machine by fastening its both ends with clamps. Subsequently, the system was sufficiently purged with nitrogen gas, and the temperature was raised in a stream of nitrogen. The cast film was made into a film having a predetermined stretching ratio at a stretching velocity of 30 mm/min at 90° to 120° C., and then annealed at constant length at 200° C. or 300° C. for 30 minutes. A biaxially stretch-oriented film was produced by stretching the cast film at a predetermined stretching ratio in two directions perpendicular to each other under the same stretching and heat treatment conditions as described above.

(3) Measurement of mechanical strength

The polyphenylenevinylene sample film was cut into a size of 1 cm×10 cm. Both ends of the film cut out were fastened and its central part having a size of 1 cm×5 cm was subjected to measurement. For this measurement, there were used SHIMADZU DSS-500 Autograph (manufactured by Shimadzu Corp.) and a stretching velocity of 200 mm/min.

In the case of the uniaxially stretch-oriented film, tensile test was carried out in the direction parallel to the direction of the stretching, whereby the physical property values were measured.

The thickness of each specimen was measured by Digital Electric Micrometer PD 505 manufactured by OZAKI SEISAKUSHO.

EXAMPLE 2

According to the method in Example 1, there were comparatively examined, for the cast film of polyelectrolyte of sulfonium salt obtained, the tensile strength, elongation at break and tensile modulus of elasticity of an unstretched film heat-treated at a predetermined temperature for 30 minutes and 4-fold and 8-fold stretched films. The results obtained are shown in Table 1.

TABLE 1

| Specimen | | Tensile strength Kg/mm$^2$ | Elongation at break % | Elastic modulus Kg/mm$^2$ |
| --- | --- | --- | --- | --- |
| 4-Fold stretched, | 200° C. | 21.2 | 5.7 | 930 |
|  | 300° C. | 27.9 | 7.0 | 940 |
| 8-Fold stretched, | 200° C. | 39.8 | 6.4 | 1370 |
|  | 300° C. | 35.8 | 8.0 | 1300 |
| Unstretched, | 200° C. | 5.7 | 15 | 170 |
|  | 300° C. | 7.2 | 16 | 190 |

Both the 4-fold and 8-fold stretched films were easily torn in a tensile test in which tension is applied in the direction perpendicular to the direction of the stretching.

The sulfur contents of these films measured by elementary analysis were 4.0% for the film treated at 200° C. and 0.3% or less for the film treated at 300° C.

EXAMPLE 3

According to the method in Example 1, there were measured, for the cast film of polyelectrolyte of sulfonium salt obtained, the tensile strength, elongation at break and tensile modulus of elasticity of a biaxially stretch-oriented film (3-fold×3-fold) heat-treated at 300° C. for 30 minutes. Further, commercially available biaxially stretch-oriented polyester film (Lumirror ®) commercialized by Toray Ind., Ltd. and polyimide film (Kapton ®) commercialized by E. I. Du Pont Nemours & Co. were compared with the above-mentioned film under the same measurement conditions as described above. The results obtained are shown in Table 2.

TABLE 2

| Specimen | Tensile strength Kg/mm$^2$ | Elongation at break % | Elastic modulus Kg/mm$^2$ |
| --- | --- | --- | --- |
| (This invention) | | | |
| Biaxially stretched, 300° C. (3 × 3) | 40.7 | 33 | 1460 |
| (Comparative Example) | | | |
| Polyester film | 18.0 | 115 | 300 |
| Polyimide film | 19.5 | 82 | 317 |

EXAMPLE 4

In the same manner as in Example 1 except that 2,5-dimethoxy-p-xylylenebis(dimethylsulfonium chloride) was used, polymerization and preparation of a film of polyelectrolyte of sulfonium salt were carried out, and then the film was biaxially stretched 1.1-fold in two directions perpendicular to each other at 70° to 100° C. in a nitrogen gas atmosphere. Further, the film was annealed at constant length at 200° C. for 30 minutes. The tensile strength, elongation at fracture and tensile modulus of elasticity of the poly-2,5-dimethoxy-p-phenylenevinylene film of 7 μm in thickness thus obtained were 22.7 kg/mm$^2$, 4.6% and 770 kg/mm$^2$, respectively.

EXAMPLE 5

A film of polyelectrolyte of sulfonium salt was prepared in the same manner as in Example 1.

The film of polyelectrolyte of sulfonium salt thus obtained was cut into a size of 50×50 mm. By means of a stretching machine which permited simultaneous stretching in two directions perpendicular to each other, the film cut out was stretched in the two directions to a size 2.5 times each as large as the original size before the stretching, at 100° to 120° C. in a nitrogen gas atmosphere. Further, while applying a low tension for stretching, the temperature was raised to 250° C., and the stretched film was heat-treated at 250° C. for 30 minutes. The IR spectrum of the film thus obtained was identical with that described in the literature (J. Polymer Sci., A-1, 6, 1058 (1968)), and its poly-p-phenylenevinylene structure was identified. The electroconductivity of this film was 10$^{-10}$ S/cm or less.

An apparatus was assembled so as to permit introduction of an inert gas by inserting a core tube made of quartz glass (30 mmϕ×700 mmL) into a horizontal type tubular electric furnace equipped with a resistance wire heater (450 mmL). A 20×30 mm film cut out of the above-mentioned biaxially stretched film was placed in the core tube in the center of the electric furnace, after which nitrogen gas was introduced thereinto at a rate of 100 ml per minute, and the temperature in the electric furnace was raised to 950° C. The film cut out was pyrolyzed at 950° C. for 2 hours and then cooled to room temperature, and the pyrolyzed product was taken out. The pyrolyzed product retained film form.

This film had an electroconductivity of 100 S/cm at room temperature. When this film was subjected to doping from vapor phase by a conventional method by using sulfuric anhydride as an electron acceptor compound, the doped film had an electroconductivity of 140 S/cm after 24 hours of the doping. The 950° C.-pyrolyzed film thus obtained was further pyrolyzed at 3,000° C. The pyrolysis was carried out by means of a graphite tube heat generator in a stream of argon for 20 minutes. The pyrolyzed product thus obtained retained film form. This film had an electroconductivity of 1.7×10$^4$ S/cm at room temperature. When this film was further doped with sulfuric anhydride, arsenic pentafluoride or nitric acid, the doped films thus obtained had as very high electroconductivities as 1.2×10$^5$ S/cm, 3.5×10$^5$ S/cm and 1.0×10$^5$ S/cm, respectively.

The determination of electroconductivity was conducted by a four-probe technique or a two-probe technique.

EXAMPLE 6

The film of polyelectrolyte of sulfonium salt obtained in Example 5 was cut into a size of 50×50 mm, and the four sides of the film cut out were fixed on a frame and heat-treated at 300° C. for 30 minutes in a nitrogen gas atmosphere. Stretching due to self-shrinkage was found in this film.

The film thus obtained was preliminarily pyrolyzed at 950° C. for 2 hours in a nitrogen gas atmosphere and then pyrolyzed at 3,000° C. for 30 minutes in an argon gas atmosphere. The pyrolyzed product retained film form. The pyrolyzed film thus obtained had an electroconductivity of 1.4×10$^4$ S/cm. After being doped with sulfuric anhydride, the pyrolyzed film had an electroconductivity of 1.1×10$^5$ S/cm.

COMPARATIVE EXAMPLE 1

The film of polyelectrolyte of sulfonium salt obtained in Example 5 was cut into a size of 50×50 mm, and the film cut out was heat-treated at 300° C. for 30 minutes without fixing the same. This film shrank by 20% of the original length.

The film thus obtained was preliminarily pyrolyzed at 950° C. for 2 hours and then pyrolyzed at 3,000° C. for 30 minutes. The pyrolyzed film had an electroconductivity of 2.1×10$^3$ S/cm. After being doped with sulfuric anhydride, this pyrolyzed film had an electroconductivity of 1.1×10$^4$ S/cm.

COMPARATIVE EXAMPLE 2

The film of polyelectrolyte of sulfonium salt obtained in Example 5 was cut into a size of 30×30 mm. Both ends of the film cut out were fixed, after which the film cut out was uniaxially stretched at 100° to 120° C. in a nitrogen gas atmosphere to a size 5 times or 8 times as large as the original size before the stretching. The temperature was further raised to 250° C., each stretched film was heat-treated at 250° C. for 30 minutes. The uniaxially stretched poly-p-phenylenevinylene films thus obtained were preliminarily pyrolyzed at 950° C. in a nitrogen gas atmosphere for 2 hours and then pyrolyzed at 3,000° C. in an argon gas atmosphere. The pyrolyzed products retained film form and had an electroconductivity of 1.15×10$^3$ S/cm or 1.20×10$^3$ S/cm, respectively. After being doped with sulfuric anhydride, the pyrolyzed products had a maximum electroconductivity of 1.8×10$^4$ S/cm or 2.1×10$^4$ S/cm, respectively.

A 3,000° C.-pyrolyzed film of a poly-p-phenylenevinylene film obtained by fixing both ends of the film cut out, under the same conditions except that no stretching treatment was carried out, had an electroconductivity of 1.10×10$^3$ S/cm. After being doped with sulfuric anhydride, this pyrolyzed film had an electroconductivity of 2×10$^4$ S/cm.

The pyrolyzed product of uniaxially stretched film is only slightly increased in electroconductivity even when a film stretched at a high ratio was used. Thus, it differed markedly in effect of stretching from a pyrolyzed product of biaxially stretched film.

EXAMPLE 7

The film of polyelectrolyte of sulfonium salt obtained in Example 5 was cut into a size of 50×50 mm, and the film cut out was stretched in two directions perpendicular to each other to a size 3.5 times each as large as the original size before the stretching, at 100° to 200° C. in a nitrogen gas atmosphere by means of a biaxial-stretching machine. Further, the temperature was raised to 300° C., and the stretched film was heat-treated for 30 minutes. Subsequently, this film was preliminarily pyrolyzed at 950° C. for 2 hours in a nitrogen gas atmosphere and then pyrolyzed at 2,750° C. for 20 minutes in an argon gas atmosphere. The pyrolyzed film thus obtained had an electroconductivity of $2.1 \times 10^4$ S/cm. The pyrolyzed film had an electroconductivity of $4.5 \times 10^5$ S/cm after being doped with arsenic pentafluoride and that of $2.4 \times 10^5$ S/cm after being doped with nitric acid.

Comparative measurement of Raman spectra was carried out for this pyrolyzed product of biaxially stretched film and a 2,750° C.-pyrolyzed product of four-ends fixed film produced in the same manner as described above. Only one peak at 1580 cm$^{-1}$ was observed in the IR spectra of each sample. Each half-width of peak at 1580 cm$^{-1}$ which is an index of graphitization was analyzed to find that the pyrolyzed product of biaxially stretched film showed a smaller half-width and hence had undergone graphitization to a larger degree. This fact indicates that by virtue of biaxial stretching treatment, graphitization by pyrolysis occurs at still lower temperatures.

EXAMPLE 8

The electroconductivities of the 3,000° C.-pyrolyzed stretched films obtained in Examples 5 and 6 and the 3,000° C.-pyrolyzed unstretched film obtained in Comparative Example 1 were determined at room temperature and liquid nitrogen temperature. The results obtained are shown in Table 3.

TABLE 3

| | Electroconductivity (S/cm) | | Electroconductivity ratio Room temperature |
|---|---|---|---|
| | Room temperature | Liquid nitrogen temperature | Liquid nitrogen temperature |
| Example 5 | $1.7 \times 10^4$ | $1.8 \times 10^4$ | 1.06 |
| Example 6 | $1.4 \times 10^4$ | $1.8 \times 10^4$ | 0.93 |
| Comparative Example 1 | $2.1 \times 10^3$ | $1.7 \times 10^3$ | 0.81 |

In the case of the pyrolyzed film obtained in Examples 5 and 6, the ratio of electroconductivity at room temperature to that at liquid nitrogen temperature was about 1, indicating that graphitization had proceeded to a very high degree. In the case of the pyrolyzed film obtained in Comparative Example 1, the ratio is considerably smaller than 1, indicating that graphitization had not proceeded sufficiently.

EXAMPLE 9

Polymerization and film-formation were carried out in the same manner as in Example 5, except that 2,5-dimethyl-p-xylylenebis(diethylsulfonium bromide) was used. The film thus obtained was stretched 1.1-fold each in two directions perpendicular to each other at the same time, subjected to conversion into poly-2,5-dimethyl-p-phenylenevinylene at 300° C., preliminarily pyrolyzed at 950° C., and then pyrolyzed at 3,000° C.

The pyrolyzed film thus obtained had an electroconductivity of $7.3 \times 10^3$ S/cm at room temperature and that of $9.6 \times 10^3$ S/cm after being doped with nitric acid. When no stretching in the two directions was conducted, the electroconductivity was $5.2 \times 10^3$ S/cm, and after doping with nitric acid, it was $8.6 \times 10^3$ S/cm.

EXAMPLE 10

Polymerization and film-formation were carried out in the same manner as in Example 1, except that 2,5-dimethoxy-p-xylylenebis(diethylsulfonium bromide) was used. The film thus obtained was stretched 1.05-fold each in two directions perpendicular to each other at the same time, subjected to conversion into poly-2,5-dimethoxy-p-phenylenevinylene at 200° C., preliminarily pyrolyzed at 950° C., and then pyrolyzed at 3,000° C.

The pyrolyzed film thus obtained had an electroconductivity of $6.4 \times 10^3$ S/cm at room temperature and that of $7.9 \times 10^3$ S/cm after being doped with nitric acid. When no stretching in the two directions was conducted, the electroconductivity was $5.5 \times 10^3$ S/cm, and after doping with nitric acid, it was $7.2 \times 10^3$ S/cm.

What is claimed is:

1. A highly electroconductive carbonaceous material obtained by a method which comprises:
   (a) biaxially stretching a film of polyelectrolyte of a sulfonium salt having a recurring unit:

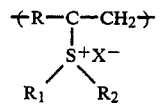

and a molecular weight greater than 3500, wherein $R_1$ and $R_2$ each represent a hydrocarbon radical having 1 to 20 carbon atoms, R is an aromatic hydrocarbon group having 6 to 20 carbon atoms, and X is an anion, at a temperature of 30°–150° C. in an inert atmosphere;
   (b) annealing the biaxially stretched film at a temperature of 150°–450° C. in an inert atmosphere, thereby forming a biaxially stretch-oriented film of a conjugated polymer of the formula:

wherein R, defined as above, forms a conjugated system with the vinylene group, and n is an integer of up to 50,000; and
   (c) pyrolyzing said annealed film at a temperature of 400°–3500° C. in an inert atmosphere.

2. A highly electroconductive carbonaceous material according to claim 1, wherein the group R in the general formula is p-phenylene group, 2,5-dimethyl-p-phenylene group, 4,4'-biphenylene group, or 2,5-dimethoxy-p-phenylene group.

3. A highly electroconductive carbonaceous material according to claim 1, wherein the stretching ratio of the biaxially stretch-oriented film is 1.1 to 5 times.

4. A highly electroconductive carbonaceous material obtained by a method which comprises:

(a) biaxially stretching a film of polyelectrolyte of a sulfonium salt having a recurring unit;

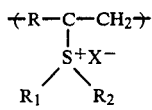

and a molecular weight greater than 3,500, wherein $R_1$ and $R_2$ each represent a hydrocarbon radical having 1 to 20 carbon atoms, R is an aromatic hydrocarbon group having 6 to 20 carbon atoms, and X is an anion, at a temperature of 30°–150° C. in an inert atmosphere;

(b) annealing the biaxially stretched film at a temperature of 150°–450° C. in an inert atmosphere, thereby forming a biaxially stretch-oriented film of conjugated polymer of the formula:

wherein R, defined as above, forms a conjugated system with the vinylene group, and n is an integer of up to 50,000;

(c) pyrolyzing said annealed film at a temperature of 400°–3500° C. in an inert atmosphere; and (d) contacting the pyrolyzed film with a dopant, wherein the amount of dopant is 0.1 to 150% based on the weight of the pyrolyzed film.

5. A highly electronconductive composition according to claim 4, wherein the group R in the general formula is p-phenylene group, 2,5-dimethyl-p-phenylene group, 4,4'-biphenylene group, or 2,5-dimethoxy-p-phenylene group.

6. A highly electroconductive composition according to claim 4, wherein the stretching ratio of the biaxially stretch-oriented film is 1.1 to 5 times.

7. A highly electroconductive composition according to claim 4, wherein the dopant is an electron acceptor or electron donor.

8. A highly electroconductive composition according to claim 7, wherein the electron acceptor is halogens, Lewis acids, or protonic acids.

9. A highly electroconductive composition according to claim 7, wherein the electron donor is alkali metal, alkalline earth metals or rare earth metals.

* * * * *